US007402330B2

(12) United States Patent
Pfeifer et al.

(10) Patent No.: US 7,402,330 B2
(45) Date of Patent: Jul. 22, 2008

(54) POLYVINYL BUTYRAL GRANULAR MATERIAL FOR 3-D BINDER PRINTING, PRODUCTION METHOD AND USES THEREFOR

(75) Inventors: Rolf Pfeifer, Sindelfingen (DE); Jialin Shen, Bernstadt (DE)

(73) Assignee: Daimler AG, Stuttgart (DE)

( * ) Notice: Subject to any disclaimer, the term of this patent is extended or adjusted under 35 U.S.C. 154(b) by 386 days.

(21) Appl. No.: 10/518,455

(22) PCT Filed: Jun. 16, 2003

(86) PCT No.: PCT/DE03/02012

§ 371 (c)(1),
(2), (4) Date: Jul. 11, 2005

(87) PCT Pub. No.: WO03/106147

PCT Pub. Date: Dec. 24, 2003

(65) Prior Publication Data

US 2005/0276976 A1 Dec. 15, 2005

(30) Foreign Application Priority Data

Jun. 18, 2002 (DE) ................. 102 27 224

(51) Int. Cl.
*B05D 5/00* (2006.01)
*B05D 1/36* (2006.01)
(52) U.S. Cl. ........................ 427/197; 427/189; 427/198; 427/201
(58) Field of Classification Search .................. 428/407; 427/180, 189, 197, 198, 201
See application file for complete search history.

(56) References Cited

U.S. PATENT DOCUMENTS 5,902,441 A 5/1999 Bredt (Continued)

FOREIGN PATENT DOCUMENTS

| EP | 0 897 745 A | 2/1999 |
| GB | 1 025 694 A | 4/1966 |
| WO | WO 02 064354 A | 8/2002 |

OTHER PUBLICATIONS

Solutia Inc: "Butvar, polyvinyl butyral resin, coatings performance materials, properties and use" Online 1999, USA XP002258293 20080 www.coatings-solutia.com.

*Primary Examiner*—H. T Le
(74) *Attorney, Agent, or Firm*—Patent Central LLC; Stephan Pendorf

(57) ABSTRACT

The invention relates to a granular material for 3D binder printing, said granular material consisting of particles provided with an externally non-polar surface layer (2). The invention also relates to a method for producing a granular material for 3D binder printing, whereby a surface layer (2) having a non-polar outer side is applied to initial particles (1), and to a method for producing an object consisting of the inventive granular material, according to which a layer of the inventive granular material is applied to a base, and predetermined regions (3) of said layer are moistened with a binding fluid, said binding fluid being selected from fluids in which a surface layer of the particles of the granular material is soluble. The invention further realties to objects consisting of interconnected particles of the inventive granular material. The invention enables a very precise printing process.

4 Claims, 1 Drawing Sheet

U.S. PATENT DOCUMENTS

| | | |
|---|---|---|
| 2002/0016387 A1 | 2/2002 | Shen |
| 2004/0036200 A1* | 2/2004 | Patel et al. .................. 264/401 |
| 2005/0003189 A1* | 1/2005 | Bredt et al. .................. 428/402 |
| 2006/0251535 A1* | 11/2006 | Pfeifer et al. .................. 419/36 |

* cited by examiner

POLYVINYL BUTYRAL GRANULAR MATERIAL FOR 3-D BINDER PRINTING, PRODUCTION METHOD AND USES THEREFOR

CROSS REFERENCE TO RELATED APPLICATION

This application is a national stage of PCT/DE03/02012 filed 16 Jun. 2003 and based upon DE 102 27 224.7 filed 18 Jun. 2002 under the International Convention.

BACKGROUND OF THE INVENTION

1. Field of the Invention

The invention relates to a granulated material for 3D binder printing, to a process for producing it, to a 3D binder printing process and to an object produceable using the granulated material or the printing process.

2. Related Art of the Invention 3D binder printing processes are processes for producing three-dimensional objects from a granulated material, in which a layer of the granulated material is placed on a base and then wetted with a binder liquid in predetermined regions which in each case correspond to a layer of an object that is to be produced. These steps are repeated until a predetermined three-dimensional object has been built up completely from joined-together granulated material particles. Then, the excess of granulated material particles is removed and the object is revealed. In a first type of these processes, the granulated material particles are partially dissolved at the surface in the regions which have been wetted by the binder liquid, and the subsequent evaporation of the binder liquid causes the particles of granulated material to be bonded to one another directly in their edge regions by fusing together. A second type of these processes uses a binder liquid which contains auxiliary substances which remain behind in the wetted regions during drying, allowing the wetted particles of granulated material to be joined to one another by subsequent partial melting or sintering.

3D binder printing processes, in particular of the first type, are known from European Patents EP 0 644 809 B1, EP 0 686 067 B1 and the European Patent Application EP 1 099 534 A2.

Binder printing processes which join the particles of granulated material by partially dissolving them using the binder liquid have the drawback that the finished object is subject to significant shrinkage compared to the region of the layer of granulated material which was originally wetted with the binder liquid. The reason for this is that partially dissolved particles which are in contact with one another draw closer together under the influence of their surface tension, resulting in a more tightly packed arrangement than hitherto after the binder liquid has dried. This effect cannot readily be avoided, and indeed is even necessary to a certain extent in order to achieve sufficiently strong cohesion of the particles in the finished object. However, one serious drawback of this effect is that the shrinkage during the drying process leads to the formation of cracks in an object produced using a process of this type which exceeds a certain maximum size.

To combat this problem, binder printing processes have been developed in which the binder liquid contains additives which remain behind in the wetted regions of the layer after the liquid has dried and make it possible to join the particles in the wetted regions by the entire mass of powder being processed, including the regions which have not been wetted, being heated in such a way that the particles in the wetted regions sinter together under the influence of the sintering aid, but the particles which have remained unwetted do not sinter together.

One problem of this technique is that the sintering aids used are generally of a mineral type and are at best dispersible but not soluble in the binder liquid, which means that they cause considerable wear to the spray nozzles used to wet the granulated material.

A further problem of the known binder printing processes is that as a result of agglomeration of the granulated materials used, objects produced thereby tend to have a nonuniform, rough surface profile which does not precisely correspond to the profile of the wetted regions.

SUMMARY OF THE INVENTION

It is an object of the invention to provide a granulated material for 3D binder printing which avoids one or more of the drawbacks listed above, and also to demonstrate a production process and applications for a granulated material of this type.

The object is achieved firstly by a granulated material composed of particles as a substrate provided with a surface layer.

The externally nonpolar surface layer of this granulated material prevents or at least reduces the build-up of hydrogen bridge bonds between particles of granulated material, both directly and via water molecules adsorbed at the surface of the particles, thereby significantly reducing agglomeration. It is in this way possible to produce objects with a smoother surface from the granulated material according to the invention than with a conventional granulated material, or if the same particle size as in a conventional granulated material is used, it is possible to produce objects with finer, more detailed structures.

According to a first preferred embodiment, the surface layer consists of a polymer material. A surface layer of this type makes it possible to achieve two types of advantageous effect. If a polymer material of this type, which is composed of monomers with polar and nonpolar groups, is applied to a polar granulated material substrate, its polar groups tend to turn toward the surface of, the granulated material particles, whereas the nonpolar groups face outward. If the thickness of the polymer layer does not exceed a monolayer of the monomers, so that the outwardly facing nonpolar groups form the outer surface of the surface layer, a granulated material with a very low tendency to form hydrogen bridges or to collect water is obtained.

If the surface layer is thicker, depending on the type of polymer material used, it is still possible to obtain a highly nonpolar, hydrophobic surface, but in this case a second useful effect which is independent of the polarity of the surface layer also occurs. On account of different chemical-physical properties of the surface layer and the material below it, it is possible to restrict the partial fusion of the particles which is required to produce a strong object from the granulated material to the surface layer and therefore, depending on the ratio of the thickness of the surface layer to the material beneath it, to limit the shrinkage of the granulated material.

Surface layer thicknesses in the range from 0.1 to 10% of the mean particle radius have proven suitable for this purpose.

Polyvinyl butyrals have proven a particularly suitable polymer material for a surface layer of this type.

According to a second embodiment, the surface layer of the granulated material consists of surfactant. Surfactants are generally characterized in that they combine polar and nonpolar groups in one molecule, so that they are able to make nonpolar substances soluble in polar solvents or vice versa on account of the fact that the polar group in each case accumulates at the polar substance and the nonpolar group accumulates at the nonpolar substance. In this case too, the thickness of the surfactant layer corresponds as accurately as possible to one monolayer, so that the polar groups of the surfactant molecules are as far as possible all directed toward the interior of the particles but the nonpolar groups of the surfactant molecules are all directed outward and thereby form the nonpolar outer surface of the granulated material.

Although the surfactant layer could be applied directly to a homogeneous core of the particles of granulated material, it is preferable for it to be applied to an intermediate layer of polymer material. Of course, this intermediate layer should have a polar outer surface.

The surfactant and intermediate layer are expediently selected in such a way that there is a solvent in which the surfactant is soluble but the intermediate layer is not. This means that it is possible for the surfactant layer to be applied by the particles provided with the intermediate layer being brought into contact with a solution of the surfactant and being dried through evaporation of the solvent.

Preferred materials for the intermediate layer are the polyvinylpyrrolidones.

In both the embodiments explained above, it is preferable for the particles to have a core of metal, ceramic or polymer material. A polymer material for the core should expediently be selected in such a way that a solvent exists which dissolves the surface layer—and, if present, the intermediate layer—but not the core. A solvent of this type can be used as binder liquid in a subsequent 3D binder printing process. Although this binder liquid partially dissolves the layers surrounding the core and thereby allows the layers of adjacent particles to fuse together, since it does not attack the core itself, the shrinkage caused by the fusion is reduced to an extent which is proportional to the ratio of the radius of the core to the thickness of the surface layer and if appropriate of the intermediate layer.

The object is also achieved by a process for producing a granulated material.

The surface layer with a nonpolar outer surface is preferably produced by the particles of the granulated material being brought into contact with a solution which contains the material of the surface layer dissolved in a first solvent and the particles being dried by evaporation of the solvent.

If an intermediate layer is to be produced, the particles are brought into contact with a solution containing the material of an intermediate layer dissolved in a second solvent even before the surface layer is deposited, and are treated in the same way as that described above.

Selecting the first solvent in such a way that it does not dissolve the material of the intermediate layer ensures that the intermediate layer remains unconsumed during production of the surface layer.

A 3D binder printing process according to the present invention is characterized in that the binder liquid used is selected from among liquids in which a surface layer of the particles of the granulated material used is soluble, but a core of the particles is not. If there is an intermediate layer, the binder liquid is preferably selected in such a way that it dissolves the intermediate layer and the surface layer. Since a substantially solids-free binder liquid can be used, the service life of the nozzles used to apply the binder liquid to the granulated material is increased.

BRIEF DESCRIPTION OF THE DRAWING

Further features and advantages of the present invention will emerge from the following description of exemplary embodiments with reference to the appended figures, in which.

DETAILED DESCRIPTION OF THE INVENTION

Figure 1:
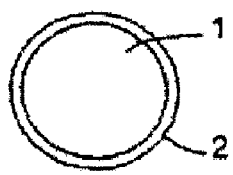
FIG. 1 shows a diagrammatic sectional view through a particle of granulated material in accordance with a first embodiment of the invention.

FIG. 1 shows a particle of granulated material in accordance with a first embodiment of the invention, in the form of a diagrammatic section. The particle is in the form of a sphere, but it will be understood that it may also take a form which deviates from the shape of a sphere, for example ellipsoidal or irregular form. The particle has a core 1, for example made from metal, ceramic or an alcohol-resistant polymer material, such as polymethyl methacrylate (PMMA), which is surrounded by a surface layer 2. A preferred material for the surface layer is a polyvinyl butyral, since this material forms a highly hydrophobic, nonpolar outer surface. Suitable polyvinyl butyrals are marketed under the name pioloform by Wacker Polymer Systems; pioloform BN18 is preferred.

The surface layer is produced by dissolving the pioloform in an alcohol, such as ethanol, isopropanol, n-butanol, etc., or an alcohol mixture, applying the solution to the particles of the granulated material and drying the particles. For this purpose, granulated material is fluidized in a fluidized bed by a hot air stream and at the same time is sprayed with the solution.

Drops of the solution which come into contact with particles of granulated material evaporate in this hot air stream, with the result that the dissolved pioloform is deposited on the particles and forms the surface layer. The resulting layer thickness can be controlled using the concentration of the solution employed and the duration of the treatment.

To produce an object from particles of the type shown in FIG. 1, a layer of particles of this type is placed on a base and sprayed from above with a binder liquid in accordance with a predetermined pattern. For this spraying operation, it is possible to use an appliance similar to a generally known ink-jet printer; appliances of this type are described in the European Patents referred to in the introduction and are not explained in more detail here.

Suitable binder liquids are the same alcohols which were also used to deposit the surface layer. To set a desired viscosity of the binder liquid, it is possible, for example, to add glycol.

Figure 2:
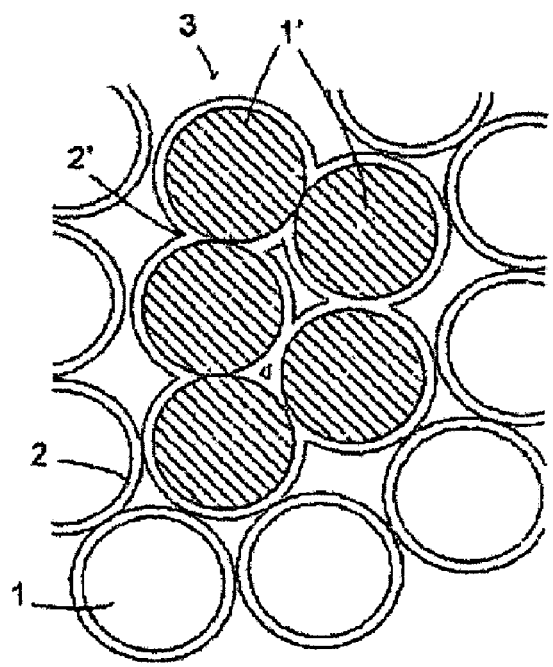
FIG. 2 shows a diagrammatic sectional view through a layer of an object produced using the granulated material shown in FIG. 1.

Spraying parts of the layer of granulated material with the binder liquid partially dissolves the surface layer 2 but not the core 1 which it encloses. The result is shown in FIG. 2, which diagrammatically depicts a section through a layer of granulated material after the binder liquid has been applied and dried. In a region 3 of the layer in which the cores 1' of the particles of granulated material are marked by hatching, the surface layers 2' of the particles have fused together, so that the particles form a cohesive body. In the area surrounding the region 3, which has not had the binder liquid applied to it, the particles have remained unchanged.

Repeated application of a layer of fresh granulated material to the layer shown in FIG. 2 and wetting of regions of the new layers with binder liquid in accordance with a predetermined pattern, which may vary from layer to layer, ultimately produces a cohesive body formed from fused-together particles of granulated material, from which it is then merely necessary to remove the surrounding particles which have remained unfused.

Since the alcohol used as binder liquid does not dissolve the cores of the particles, their original form remains unchanged in the finished object, and consequently the shrinkage of the finished object can be no stronger than the ratio of the thickness of the surface layer 2 to a mean radius of the cores of the particles. This thickness may, for example, amount to 0.5 μm for a mean radius of approx. 10 μm.

The nonpolar nature of the outer surfaces of the particles prevents agglomeration of the particles before the partial dissolution of their surface layer and thereby ensures uniform spaces remain between the unjoined particles and accordingly also ensures a uniform propagation of binder liquid which is sprayed on. Consequently, the surfaces of the object obtained are uniformally smooth and accurately follow the predetermined pattern of the distribution of the binder liquid.

Figure 3:
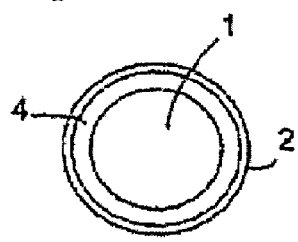
FIG. 3 shows a diagrammatic sectional view through a particle of granulated material in accordance with a second embodiment of the invention.

FIG. 3 shows a diagrammatic section through a particle of a granulated material according to the invention in accordance with a second embodiment of the invention. The particle once again has a core 1 of ceramic, metal or polymer material and a surface layer 2. The surface layer 2, unlike in the case of the particle shown in FIG. 1, does not consist of a polymer material, but rather is a monolayer of a surfactant. This surfactant may be any surfactant which is known from the field of detergents, cleansing agents or body-care agents, such as for example sodium lauryl sulphate, a betaine or the like.

Between the surface layer 2 and the core 1 there is an intermediate layer 4 of a polymer material. As in the first exemplary embodiment, this polymer material may be a polyvinyl butyral, such as pioloform, but it is also possible to use other classes of polymers, such as for example polyvinyl pyrrolidones, in particular the materials marketed by BASF under the tradenames Luviskol and Luvitec, as well as an acrylic polymer marketed under the name Bellac by Belland AG.

The thickness of the intermediate layer 4 is of the order of magnitude of 0.1 to 10% of the mean radius of the particles, i.e. for a mean particle diameter of approx. 20 μm, the layer thickness may, for example, expediently be 0.5 μm. A layer of this type is thicker by a multiple than a monolayer, and therefore the extent of the polarity of the outer surface of the intermediate layer 4 is determined not by whether the material of the core 1 is polar or nonpolar, but rather by the intrinsic properties of the polymer used for the intermediate layer 4 itself. The extent of the polarity of the outer side of the intermediate layer 4 differs for the various materials but is clearly sufficient, even for polyvinyl butyral, which is the most strongly hydrophobic of the intermediate layer materials tested, to allow the tendency toward agglomeration after the monomolecular surfactant surface layer 1 has accumulated on the intermediate layer 4 to be reduced. Therefore, for all the intermediate layer materials tested, the surfactant reduces the tendency toward agglomeration compared to a granulated material without a layer of surfactant. However, the effect of the layer of surfactant is most pronounced with the intermediate layer materials which are polar at the surface, such as polyvinyl pyrrolidone or Bellac; the tendency of a polyvinyl butyral surface toward agglomeration is inherently already so low that the tendency of the granulated material toward agglomeration is sufficiently suppressed even without a layer of surfactant, for example with a structure in accordance with the first exemplary embodiment.

A granulated material comprising particles of the structure shown in FIG. 3 can be produced by a starting powder of ceramic, metal, polymer or a mixture of these materials being fluidized in a fluidized bed by a hot air stream and being sprayed for a certain time with a finely atomized solution of the intermediate layer material. The solvent evaporates within a very short time in the hot air stream, so that the dissolved intermediate layer material is deposited from drops which strike the particles of the starting material and forms a continuous film over the course of the treatment. As has been indicated above, a suitable solvent for polyvinyl butyral is an alcohol or alcohol mixture. Polyvinyl pyrrolidone and Bellac are soluble in basic aqueous media, and in this case it is preferable for the solvent used to be a solution of ammonia in water, since this solution has the advantage over many other basic aqueous solutions of evaporating without leaving any residues.

The surface layer of surfactant is produced in a similar way to the intermediate layer by spraying the particles which have been fluidized in a fluidized bed with a second solution which is an aqueous solution of the surfactant. Since polyvinyl butyral is not soluble in water, an intermediate layer 4 consisting of this material is not attacked in this second coating operation. If the intermediate layer consists of polyvinyl pyrrolidone, which is soluble in weak acids and bases, it should be ensured that the surfactant solution is pH-neutral. In the case of an intermediate layer formed from Bellac, which is soluble in basic media, the pH of the second solution should not exceed 9.5.

The production of an object from the material obtained in this way proceeds in substantially the same way as that described above with reference to FIG. 2; the binder liquid used is in each case a liquid which dissolves the surface and intermediate layer, i.e. an alcohol in the case of a polyvinyl butyral intermediate layer or a basic aqueous solution, such as for example ammonia solution, in the case of intermediate layers formed from polyvinyl pyrrolidone or Bellac.

Figure 4:
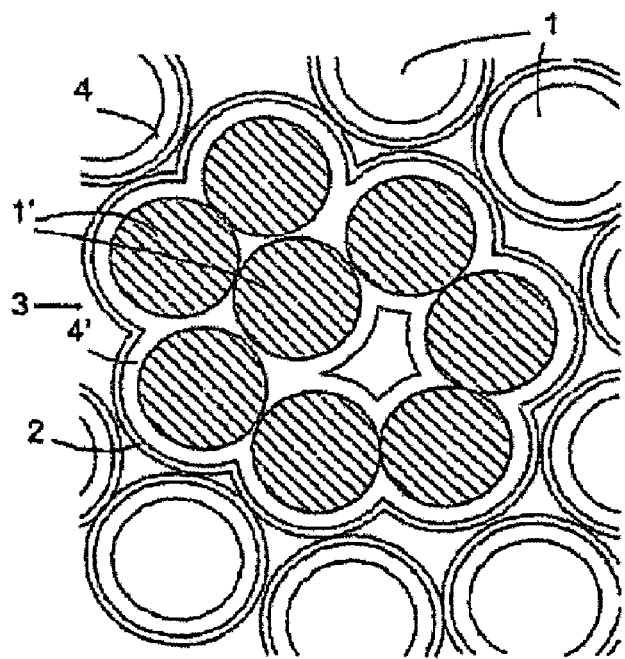
FIG. 4 shows a diagrammatic sectional view through a layer of an object produced from particles of granulated material as shown in FIG. 3.

FIG. 4, analogously to FIG. 2, shows a section through a layer of the granulated material according to the invention after application of the binder liquid to the region 3, in which the cores 1' of the particles of granulated material are once again indicated by hatching. In the interior of the region 3, where surface and intermediate layers of the particles have been partially dissolved by the binder liquid, the surface layers can no longer be recognized and the intermediate layers 4' have fused together at the points of contact between the particles. At the edge of the region 3, where no binder liquid has reached, the surface layer 2 continues and prevents agglomeration with adjacent particles, with the result that a finished object with an accurately shaped, smooth surface is obtained.

The invention claimed is:

1. A 3D binder printing process for producing an object from a granulated material, the process comprising the steps of:

placing a layer of the granulated material onto a base, and wetting predetermined regions of the layer with a binder liquid, wherein the granulated material consists of particles with a surface layer, the surface layer consists of a polyvinyl butyral and has a nonpolar outer surface, and the binder liquid is selected from among liquids in which the surface layer of the particles of the granulated material is soluble.

2. The process of claim 1, wherein a thickness of the surface layer approximately corresponds to a monolayer of polyvinyl butyral monomers.

3. The process of claim 1, wherein a thickness of the surface layer amounts to approximately 0.1 to 10% of a mean radius of the particles.

4. The process of claim 1, wherein a viscosity of the binder liquid is adjustable by an addition of glycols.

* * * * *